United States Patent
Cunningham et al.

(10) Patent No.: US 7,229,100 B2
(45) Date of Patent: Jun. 12, 2007

(54) GAS GENERATOR FOR SEAT BELT PRETENSIONER

(75) Inventors: Clare R. Cunningham, Mesa, AZ (US); Brian R. Pitstick, Mesa, AZ (US); Bryan W. Shirk, Mesa, AZ (US); Kevin S. Countryman, Mesa, AZ (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 11/255,498

(22) Filed: Oct. 20, 2005

(65) Prior Publication Data

US 2006/0076766 A1   Apr. 13, 2006

Related U.S. Application Data

(62) Division of application No. 10/354,688, filed on Jan. 30, 2003, now Pat. No. 6,979,024.

(51) Int. Cl.
*B60R 22/46* (2006.01)

(52) U.S. Cl. .................. 280/806; 60/632; 102/467; 102/531; 242/374

(58) Field of Classification Search ............. 280/806; 242/374; 60/632, 635, 638; 297/480; 102/530, 102/531, 467, 202.14
See application file for complete search history.

(56) References Cited

U.S. PATENT DOCUMENTS

| | | | |
|---|---|---|---|
| 3,162,125 A | 12/1964 | Lewis et al. | |
| 3,207,074 A | 9/1965 | Kinna et al. | |
| 3,656,434 A | 4/1972 | Curran | |
| 5,046,429 A * | 9/1991 | Swann et al. | 102/530 |
| 5,553,890 A | 9/1996 | Buhr et al. | |
| 5,624,083 A | 4/1997 | Modinger et al. | |
| 5,681,004 A | 10/1997 | Specht | |
| 5,749,536 A | 5/1998 | Specht et al. | |
| 5,842,344 A | 12/1998 | Schmid | |
| 5,956,954 A * | 9/1999 | Schmid | 60/636 |
| 6,149,095 A | 11/2000 | Specht et al. | |
| 6,227,478 B1 * | 5/2001 | Hudelmaier et al. | 242/374 |
| 6,454,306 B1 | 9/2002 | Cunningham et al. | |
| 6,553,914 B2 | 4/2003 | Hosey et al. | |
| 6,979,024 B2 * | 12/2005 | Cunningham et al. | 280/806 |

* cited by examiner

*Primary Examiner*—Ruth Ilan
*Assistant Examiner*—Tiffany L. Webb
(74) *Attorney, Agent, or Firm*—Tarolli, Sundheim, Covell & Tummino LLP

(57) ABSTRACT

An apparatus comprises vehicle seat belt webbing (18), a cylinder (50), and a piston (60) movable in the cylinder to effect pretensioning of the seat belt webbing. The apparatus also comprises a fluid source (10) for providing fluid under pressure to move the piston (60) in the cylinder (50). The fluid source (10) comprises a propellant container (122) defining a propellant chamber (123) and a propellant (82) in the propellant chamber. The propellant (82) is ignitable to produce fluid under pressure. The propellant container (122) comprises a first portion (124) made from plastic and a second portion (126) made from metal. The metal portion (126) is secured to the plastic portion (124) to effect a hermetic seal of the propellant container (122).

15 Claims, 4 Drawing Sheets

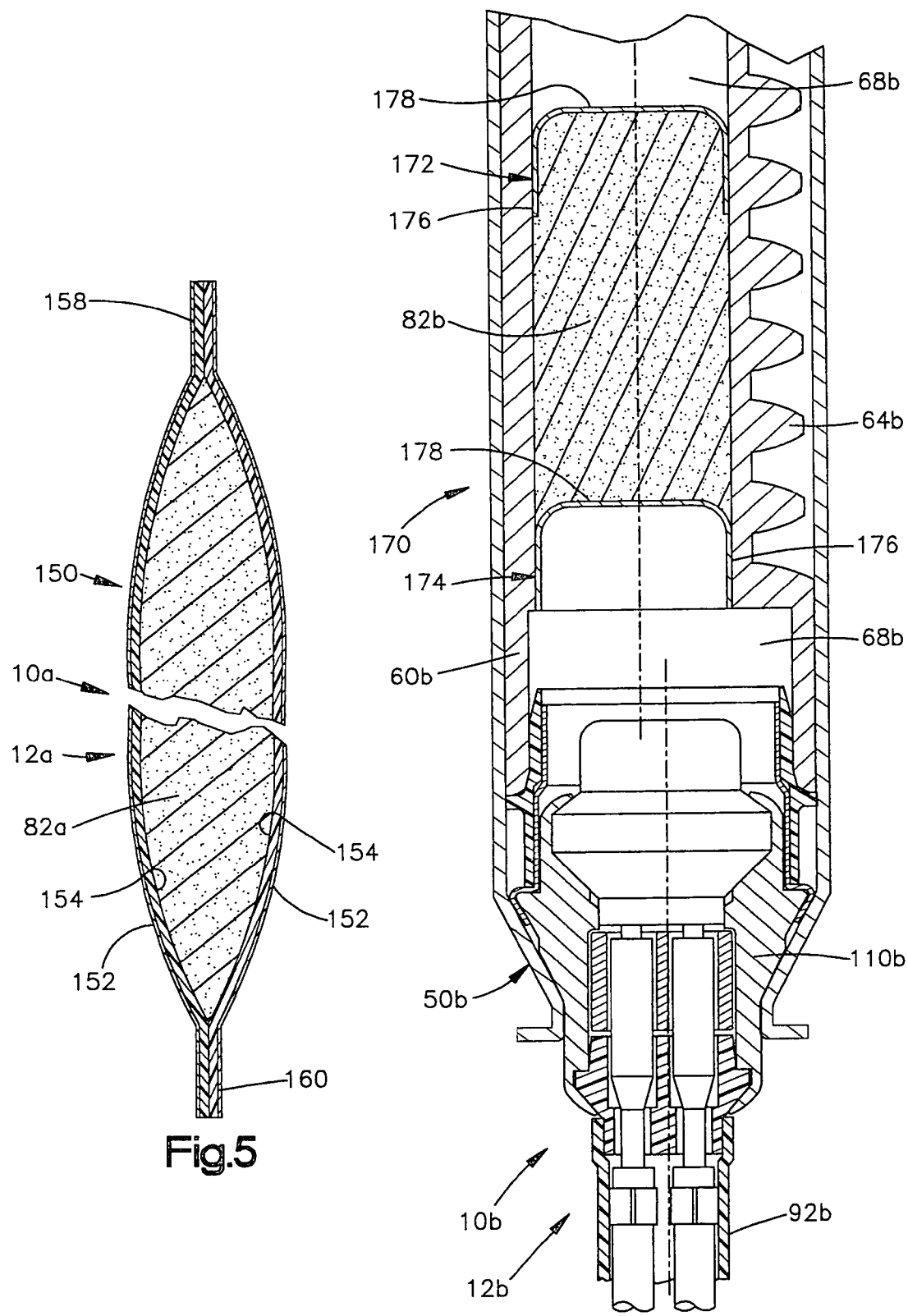

GAS GENERATOR FOR SEAT BELT PRETENSIONER

RELATED APPLICATION

This application is a divisional of patent application Ser. No. 10/354,688, filed Jan. 30, 2003 now U.S. Pat. No. 6,979,024.

TECHNICAL FIELD

The present invention relates to an apparatus for helping to protect a vehicle occupant and, in particular, to a gas generator usable in a seat belt webbing pretensioner.

DESCRIPTION OF THE PRIOR ART

A known vehicle seat belt system includes a retractor on which seat belt webbing is wound. The retractor has a spool, which is rotatable in a belt withdrawal direction and in an opposite belt retraction direction. The seat belt system also includes a pretensioner. The pretensioner includes a gas generator, which is electrically actuatable to produce fluid under pressure to move a piston in a cylinder. Rack teeth formed on the piston are in meshing engagement with a pinion. Upon actuation of the gas generator, fluid under pressure causes linear movement of the piston, and the rack teeth move linearly to rotate the pinion in a first direction. Rotation of the pinion in the first direction results in rotation of the seat belt webbing spool in a first direction, to remove slack from the seat belt webbing.

The gas generator includes a body of solid propellant and an electrically actuatable initiator for igniting the propellant to generate gas under pressure. Upon actuation of the gas generator, the pressurized gas causes the piston to move to the opposite end of the cylinder, resulting in rotation of the spool in the first direction.

One known gas generator for a seat belt pretensioner includes a molded plastic shell to enclose the propellant. Because the shell is plastic, it electrically isolates the propellant, but it does not hermetically seal the propellant. In addition, the plastic shell breaks into fragments upon ignition of the propellant, and the fragments must be filtered.

Another known gas generator for a seat belt pretensioner has a metal shell, which encloses and hermetically seals the propellant and an electrically energizable bridgewire. The metal shell ruptures upon ignition of the propellant and thus does not produce fragments that must be filtered. The metal shell, however, does not electrically isolate the bridgewire and propellant.

SUMMARY OF THE INVENTION

The present invention is an apparatus comprising vehicle seat belt webbing, a cylinder, and a piston movable in the cylinder to effect pretensioning of the seat belt webbing. The apparatus also comprises a fluid source for providing fluid under pressure to move the piston in the cylinder. The fluid source comprises a propellant container defining a propellant chamber and a propellant in the propellant chamber. The propellant is ignitable to produce fluid under pressure. The propellant container comprises a first portion made from plastic and a second portion made from metal. The metal portion is secured to the plastic portion to effect a hermetic seal of the propellant container.

BRIEF DESCRIPTION OF THE DRAWINGS

Further features of the present invention will become apparent to those skilled in the art to which the present invention relates from reading the following specification with reference to the accompanying drawings, in which:

FIG. 5 is a sectional view of a propellant container that forms part of the gas generator of FIG. 4, taken along line 5—5 of FIG. 4; and FIG. 6 is a view similar to FIG. 3 of a gas generator constructed in accordance with a third embodiment of the present invention.

DETAILED DESCRIPTION OF THE INVENTION

Figure 1:
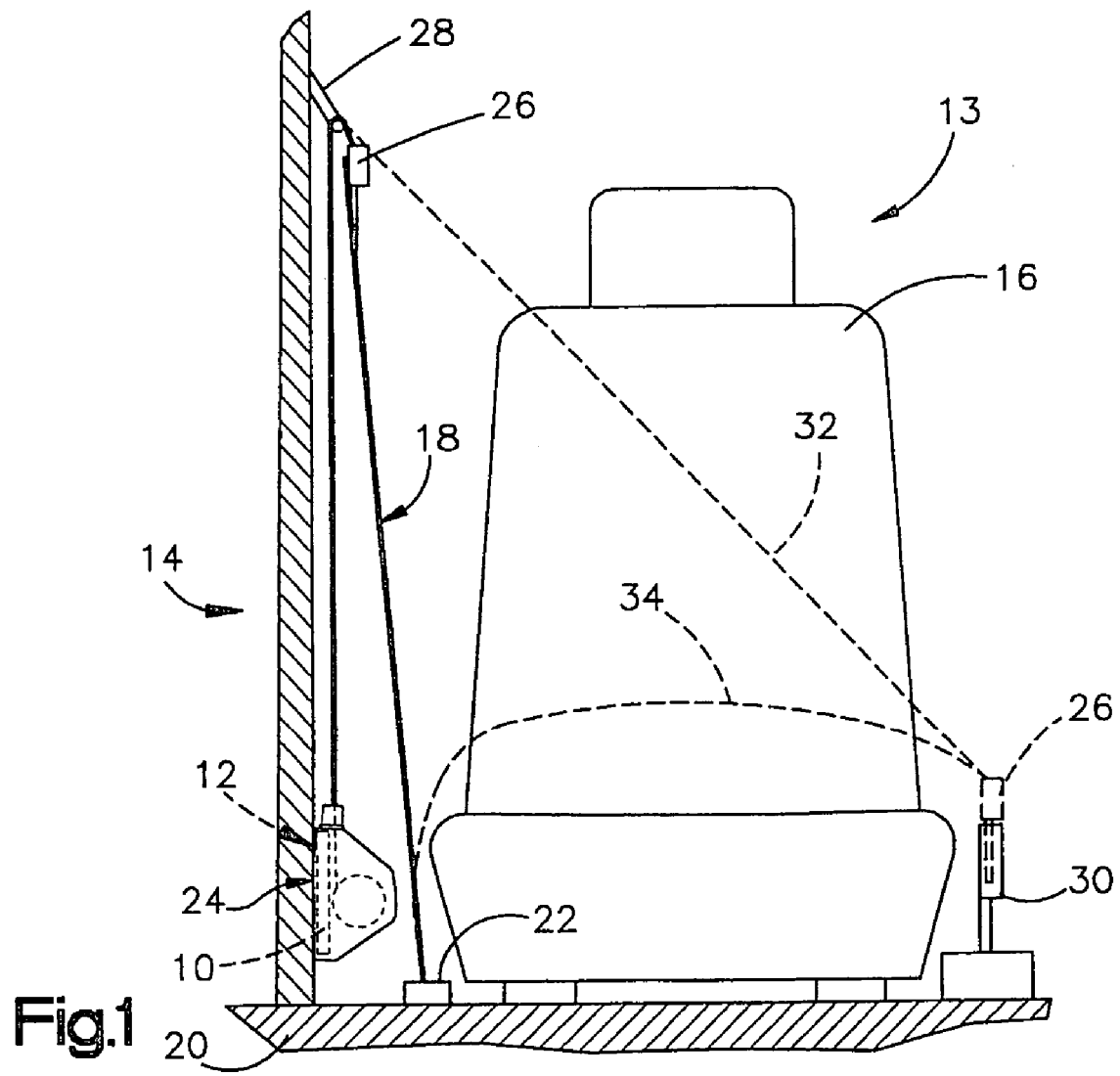
FIG. 1 is a schematic illustration of a vehicle seat belt system having a pretensioning assembly including a gas generator constructed in accordance with a first embodiment of the present invention.

The present invention relates to an apparatus for helping to protect a vehicle occupant and, in particular, to a gas generator usable in a seat belt webbing pretensioner. As representative of the present invention, FIG. 1 illustrates a gas generator 10. The gas generator 10 is incorporated in a pretensioner 12 of a three-point continuous loop seat belt system 13 for use in helping to protect an occupant of a vehicle 14.

During operation of the vehicle 14, an occupant of the vehicle sits on a seat 16, illustrated as a front passenger seat of the vehicle. A length of belt webbing 18 is extensible about the vehicle occupant. One end of the length of belt webbing 18 is anchored to the vehicle body 20 at an anchor point 22. The opposite end of the belt webbing 18 is attached to a retractor 24 secured to the vehicle body 20. The pretensioner 12 is connected with the retractor 24. Intermediate its ends, the belt webbing 18 passes through a tongue assembly 26 and a D-ring or turning loop 28. When the seat belt system 13 is not in use, the belt webbing 18 is wound on the retractor 24 and is oriented generally vertically on one side of the seat 16, as shown in solid lines in FIG. 1.

To engage the seat belt system 13, the tongue assembly 26 is manually grasped and is pulled across the lap and torso of the occupant sitting in the seat 16. As the tongue assembly 26 is pulled across the lap and torso of the occupant, the tongue assembly moves along the belt webbing 18, and the belt webbing is unwound from the retractor 24. When the belt webbing 18 has been pulled across the lap and torso of the occupant, the tongue assembly 26 is connected with a buckle 30, as shown in dashed lines in FIG. 1. The buckle 30 is disposed on the side of the seat 16 opposite the anchor point 22 and the retractor 24. When the seat belt system 13 is thus buckled, the length of belt webbing 18 is divided by the tongue assembly 26 into a torso portion 32, which extends across the torso of the occupant, and a lap portion 34, which extends across the lap of the occupant.

The pretensioner 12 (FIG. 2) includes a pretensioning mechanism 40. The pretensioning mechanism 40 includes a housing 42. The housing 42 supports a rotatable pinion 44, which is connected in a force-transmitting relationship with the spool 46 of the retractor 24. Specifically, the gear teeth on the pinion 44 are in meshing engagement with gear teeth formed on one end of the spool 46. The housing 42 may be (or may include) the housing for the retractor 24.

The housing 42 supports a cylinder 50. An upper or outer end portion 52 of the cylinder 50 has a combustion products outlet opening 54. The cylinder 50 has an opposite lower end portion 56 that is smaller in diameter than the upper end portion 52.

Figure 2:
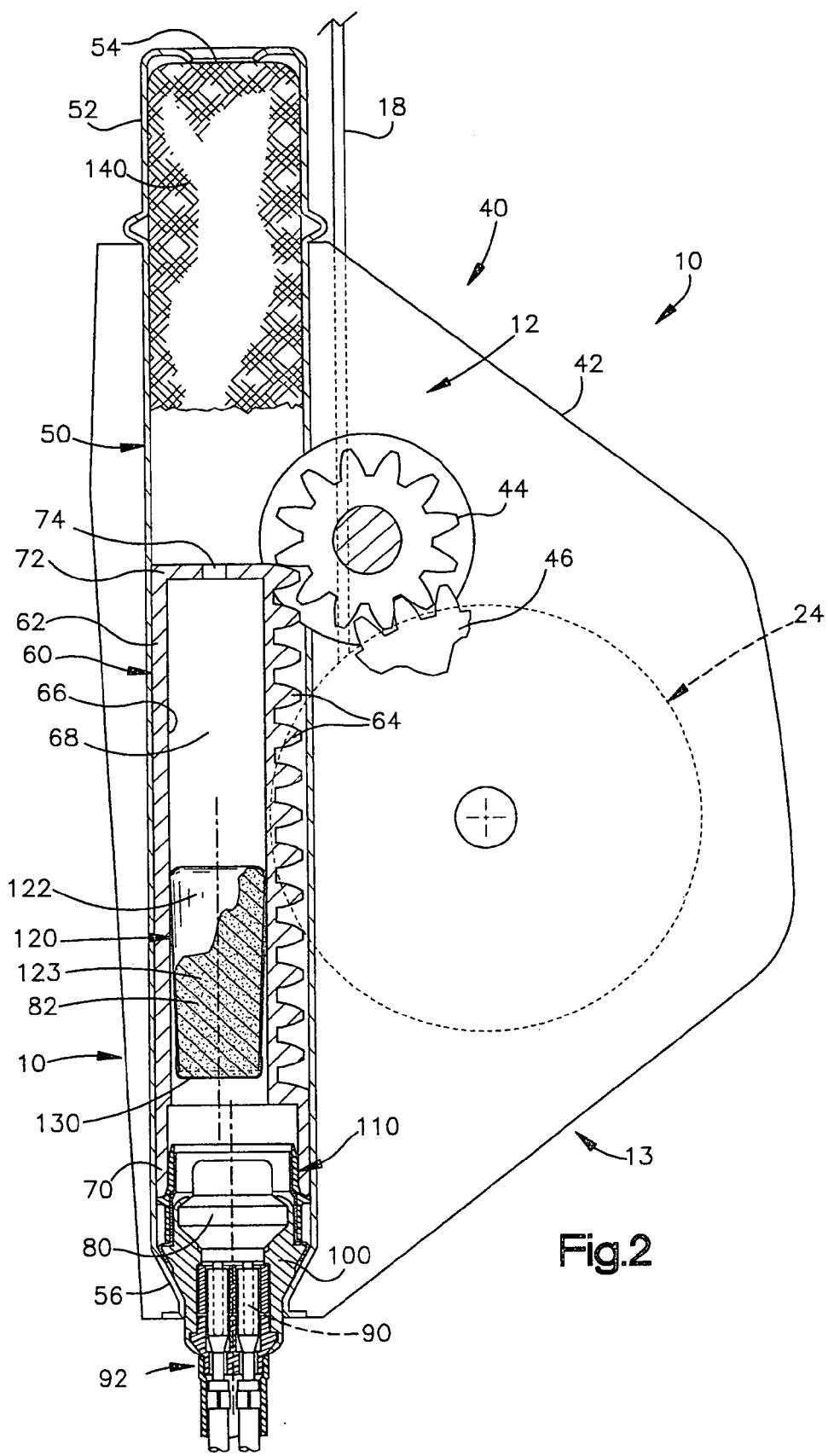
FIG. 2 is an enlarged view, partially in section, of the pretensioning assembly of FIG. 1 and showing the gas generator.

A piston 60 is supported in the cylinder 50 for sliding movement between an unactuated position adjacent the lower end portion 56 of the cylinder 50, as shown in FIG. 2, and an actuated position (not shown) adjacent the upper end portion 52 of the cylinder. The piston 60 is an elongate, tubular member with an outer side wall 62. The side wall 62 has an outer surface on one side of which is formed a set of rack teeth 64. The side wall 62 has a cylindrical inner surface 66 defining a central chamber or bore 68 in the piston 60.

The rack teeth 64 on the piston 60 are in meshing engagement with the pinion 44. As a result, linear movement of the piston 60, as described below, causes rotation of the pinion 44 and, thereby, rotation of the retractor spool 46.

The piston 60 has a closed upper or outer end portion 72 and an opposite lower or inner end portion 70 that is open. The outer end portion 72 of the piston 60 is formed with an outlet opening 74 for permitting flow of combustion products out of the piston.

The gas generator 10 includes an initiator 80. The initiator 80 is preferably a known device of the type used for actuating an air bag inflator, such as the initiator shown in U.S. Pat. No. 5,733,135. The initiator 80, when energized, produces combustion products for initiating actuation of a propellant 82, described below in detail. The propellant 82 is a known material ignitable to generate fluid, in the form of gas under pressure, for moving the piston 60.

Figure 3:
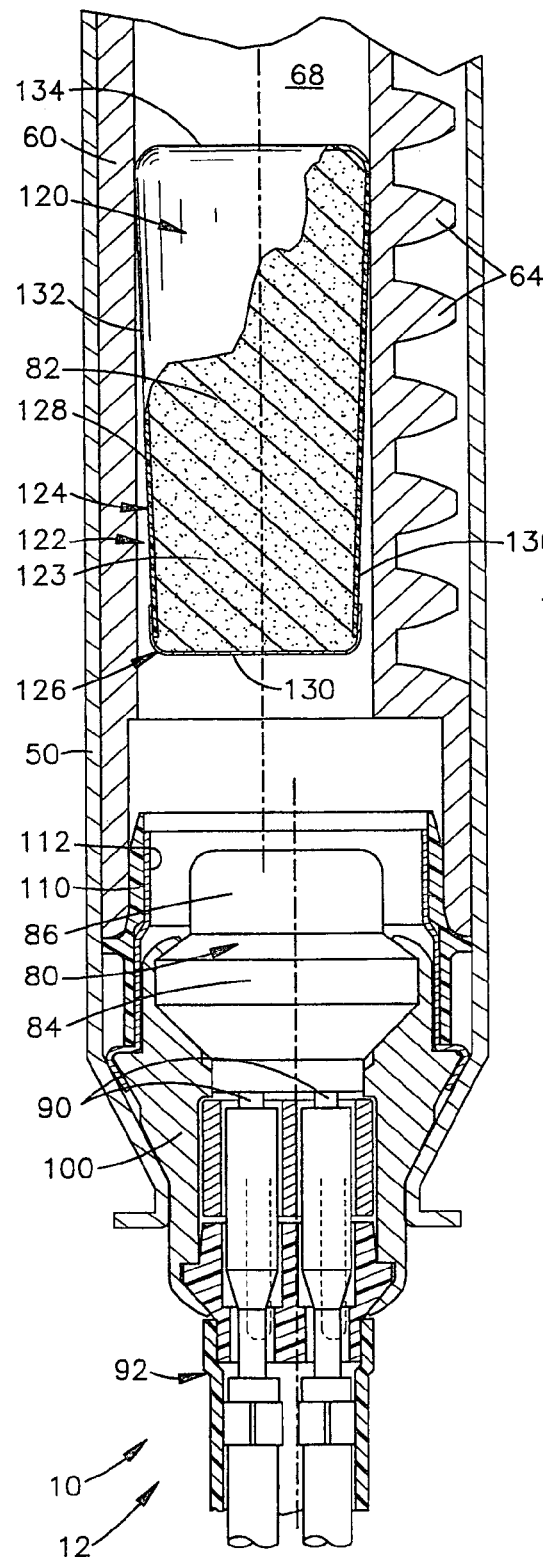
FIG. 3 is a further enlarged view of a portion of the gas generator of FIG. 2.

The initiator 80 has a main body portion 84 (FIG. 3) covered by an electrically non-conductive material 86, such as molded plastic. The initiator 80 has two electrically conductive terminal pins 90. The terminal pins 90 are electrically connected, within the initiator 80, with a resistance wire or bridgewire (not shown) adjacent to an ignitable material (not shown). The terminal pins 90 are engageable by a wire harness 92, described below, to enable transmission of an electric current to the bridgewire to cause ignition of the ignitable material in the initiator 80.

The gas generator 10 includes a retainer 100 for mounting the gas generator 10 in the pretensioner housing 42. The retainer 100 is made from a malleable material, which is machined, or cast, and subsequently formed to the illustrated configuration. The retainer 100 may be made from an electrically conductive material, such as zinc or aluminum. A portion of the retainer 100 is crimped around the initiator 80 to secure the initiator in the retainer.

The gas generator 10 includes a rack spacer 110 for positioning the piston 60 relative to the initiator 80 in the pretensioner housing 42. The rack spacer 110 is molded as one piece from a plastic material, and has an interference fit within the inner end portion 70 of the piston 60. In addition, the material of the rack spacer 110 is selected to have characteristics that help the rack spacer to grip the inner surface 66 of the side wall 62 of the piston 60. The rack spacer 110 is fitted around the retainer 100, with a metal support member 112 between them. The rack spacer 110 positions the assembly of the initiator 80 and retainer 100 relative to the piston 60.

The gas generator 10 includes a cartridge 120. In the illustrated embodiment, the cartridge 120 includes a hermetically sealed container 122, and also the propellant 82, which is located in the container. The container 122 includes a plastic portion 124 and a metal portion 126. The plastic portion 124 of the container 122 forms a main body portion 128 of the container 122, and the metal portion 126 forms a lid 130 of the container. The metal lid 130 is crimped onto the plastic main body portion 128, or otherwise sealed, to form a hermetic seal.

The plastic portion 124 of the propellant container 122 may take many different forms in accordance with the invention. In the illustrated embodiment, the plastic portion 124 includes a frustoconical side wall 132 and a planar end wall 134. The end wall 134 may be weakened in a predetermined configuration to enable it to open in a controlled manner, for example, with a cruciform tear seam (not shown). The narrow end 136 of the side wall 132 is open and receives the metal lid 130. The plastic portion 124 of the container 122 is preferably made from a semi-rigid or resilient material that is strong enough to withstand handling during assembly and has a long life when in the pretensioner 12.

The container 122 is sized to fit easily into the bore 68 of the piston 60. The container 122 defines a propellant chamber 123. The container 122 has a volume less than the volume of the piston bore 68, and may have a volume substantially less than the volume of the piston bore. Providing a separate container 122 for the propellant 82 in the piston bore 68, instead of placing the propellant loose in the piston bore, facilitates using different, pre-measured, quantities of propellant in different pretensioners that otherwise have the same construction.

When the cartridge 120 is placed in the piston bore 68 during assembly of the pretensioner 12, the cartridge 120 may be movable in the piston bore. The cartridge 120 preferably has a friction fit within the piston bore 68 to hold the cartridge 120 releasably in place in the piston bore.

The piston 60 is in an initial position or starting position as viewed in FIG. 2. The rack teeth 64 on the piston 60 are in meshing engagement with the pinion 44. In the event of a vehicle collision for which actuation of the pretensioner 12 is desired, the initiator 80 is electrically actuated through the wire harness 92. The initiator 80 generates combustion products under pressure, which flow into the bore 68 of the piston 60. The combustion products of the initiator 80 rupture the metal lid 130 of the propellant container 122 and contact the propellant 82.

The propellant 82 is ignited and generates fluid under pressure, rupturing the end wall 134 of the propellant container 122. The fluid generated by ignition of the propellant 82 flows out of the propellant container 122 into the bore 68 of the piston 60. The pressure of the fluid generates a force that causes the piston 60 to move in the cylinder 50, off the rack spacer 110, in a direction away from the gas generator 10.

The movement of the piston 60 in the cylinder 50 causes the rack teeth 64 on the piston to rotate the pinion 44 in a first direction. Rotation of the pinion 44 results in rotation of the spool of the retractor 24 in the belt retraction direction, to remove slack from the seat belt webbing 18. The movement of the piston 60 in the direction away from the gas generator 10 is stopped by a flame arrestor 140 in the cylinder 50 and by the radially extending end wall of the upper end portion 52 of the cylinder 50.

Figure 4:
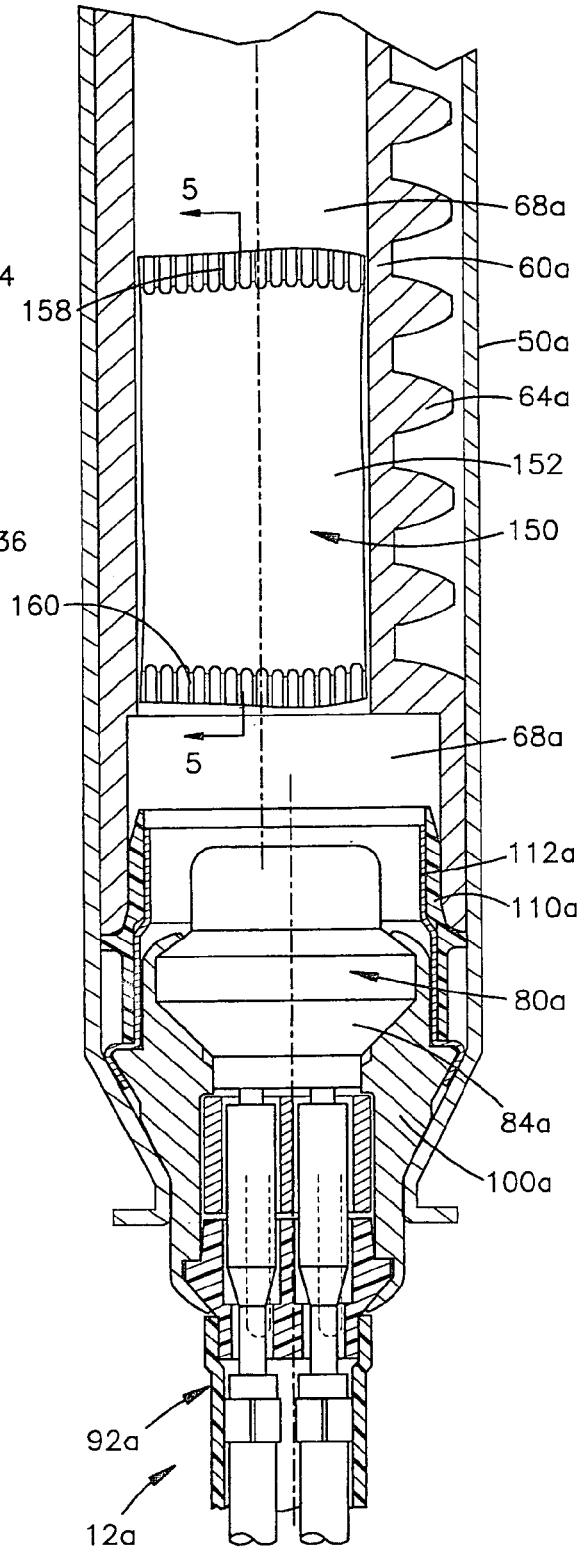
FIG. 4 is a view similar to FIG. 3 of a gas generator constructed in accordance with a second embodiment of the present invention.

FIGS. 4 and 5 illustrate a pretensioner 12a in accordance with a second embodiment of the invention. With the exception of the propellant container, the pretensioner 12a has the same construction as the pretensioner 12, and parts that are the same in both embodiments are given the same reference numeral with the suffix "a" attached in FIGS. 4 and 5.

The pretensioner 12a includes a propellant container in the form of a hermetically sealed bag 150. The illustrated bag 150 includes a plastic portion 154 and a metal portion 152, although other bags usable as propellant containers could have different configurations.

The plastic portion 154 of the bag 150 serves as a liner for the metal portion 152. Thus, the propellant 82a in the bag 150 is in contact with the plastic 154. The bag 150 is made from a tubular portion 156 of metal-coated plastic material that is crimped at both ends 158 and 160 to seal the bag. The bag is sealed by adhering the plastic layer 154 to itself, by ultrasonic welding, heat sealing (melting), an adhesive, or other appropriate process.

The bag 150 is sized to fit easily into the bore 68a of the piston 60a. The bag 150 has a volume less than the volume of the piston bore 68a, and may have a volume substantially less than the volume of the piston bore. When the bag 150 is placed in the piston bore 68a during assembly of the pretensioner 12a, the bag may be movable in the piston bore. The bag 150 preferably has a friction fit within the piston bore 68a to hold the bag releasably in place.

When the initiator 80a is actuated, its combustion products flow into the bore 68a of the piston 60a. The combustion products of the initiator 80a rupture the material of the bag 150 and contact the propellant 82a. The propellant 82a is ignited and generates fluid under pressure, which fluid causes the piston 60a to move in the cylinder 50a.

FIG. 6 illustrates a pretensioner 12b in accordance with a third embodiment of the invention. With the exception of the propellant container, the pretensioner 12b has the same construction as the pretensioner 12, and parts that are the same in both embodiments are given the same reference numeral with the suffix "b" attached in FIG. 6.

The pretensioner 12b includes a propellant container 170 in the form of two metal retainers 172 and 174 spaced apart with the propellant 82b between them. The retainers 172 and 174 as illustrated are identical to each other, but could be different from each other.

Each one of the retainers 172 and 174 has a cup-shaped configuration including a cylindrical side wall 176 and a planar end wall 178. The side walls 176 of the retainers 172 and 174 have a diameter selected to provide the retainers with a press fit or interference fit in the piston bore 68b. The retainer end walls 178 may be weakened in a predetermined configuration to enable them to open or be ruptured in a controlled manner, for example, with a cruciform tear seam (not shown).

The amount of propellant 82b in the container 170 determines the distance between the retainers 172 and 174. Different propellant containers 170 can have different volumes (different amounts of propellant 82b), and still fit in the piston bore 68b. The container 170 has a volume less than the volume of the piston bore 68, and may have a volume substantially less than the volume of the piston bore.

From the above description of the invention, those skilled in the art will perceive improvements, changes and modifications in the invention. For example, a pretensioner including a gas generator in accordance with the invention could be located at other points in the seat belt system 13, for example, at the buckle 30 or at the anchor point 22. Such improvements, changes and modifications within the skill of the art are intended to be covered by the appended claims.

Having described the invention, we claim:

1. An apparatus comprising:
    a cylinder;
    a piston movable in said cylinder to effect pretensioning of vehicle seat belt webbing, said piston having a bore with a first volume; and
    a fluid source for providing fluid under pressure to move said piston in said cylinder, said fluid source comprising a propellant container defining a propellant chamber and a propellant in said propellant chamber, said propellant being ignitable to produce fluid under pressure;
    said propellant container having portions disposed in said bore in said piston and having a second volume that is less than said first volume of said piston bore, said propellant container portions being movable into said bore during assembly of said apparatus and, thereafter, being releasably held in place in said bore with a friction fit, said propellant container comprising first and second retainers spaced apart with said propellant held between them.

2. An apparatus as set forth in claim 1 wherein said first and second retainers are cup-shaped metal pieces.

3. An apparatus as set forth in claim 1 wherein said first retainer and said second retainer have cylindrical side walls with equal diameters.

4. An apparatus as set forth in claim 1 wherein said piston has an inner surface defining said bore, said propellant contacting said inner surface.

5. An apparatus as set forth in claim 1 wherein said first retainer and said second retainer have end walls with equal diameters.

6. An apparatus as set forth in claim 1 wherein said first retainer and said second retainer are identical.

7. An apparatus as set forth in claim 1 wherein said first and said second retainers are releasably held in place in said bore with a friction fit.

8. An apparatus as set forth in claim 1 wherein said first and said second retainers have end walls and side walls extending from said end walls, said side walls engaging an inner surface of said piston defining said bore.

9. An apparatus as set forth in claim 8 wherein said side walls of said first and second retainers extend from said end walls in the same direction.

10. An apparatus comprising:
    a cylinder;
    a piston movable in said cylinder to effect pretensioning of a vehicle seat belt webbing, said piston having an inner surface defining a bore with a first volume;
    a fluid source for providing fluid under pressure to move said piston in said cylinder, said fluid source comprising a propellant container defining a propellant chamber and a propellant in said propellant chamber, said propellant being ignitable to produce fluid under pressure said propellant contacting said inner surface of said piston; and
    said propellant container having portions disposed in said bore in said piston and having a second volume that is less than said first volume of said piston bore, said propellant container portions being movable into said bore during assembly of said apparatus and, thereafter, being releasably held in place in said bore with a friction fit.

11. An apparatus as set forth in claim 10 wherein said propellant container includes first and second retainers spaced apart and releasably held in place in said bore with a friction fit.

12. An apparatus as set forth in claim 11 wherein said first retainer and said second retainer have cylindrical side walls with equal diameters.

13. An apparatus as set forth in claim 11 wherein said first retainer and said second retainer have end walls with equal diameters.

14. An apparatus as set forth in claim 11 wherein said first retainer and said second retainer are identical.

15. An apparatus as set forth in claim 11 wherein said first and second retainers have end walls and side walls extending from said side walls, said side walls engaging said inner surface of said piston and extending from said end walls in the same direction.

* * * * *